United States Patent [19]
Newman, Jr.

[11] Patent Number: 5,957,048
[45] Date of Patent: Sep. 28, 1999

[54] CLAMPING STRIPS AND LOCKING CHANNELS

[76] Inventor: Eugene Frank Newman, Jr., 7946 Stonehurst Dr., Dublin, Ohio 43016-9099

[21] Appl. No.: 09/031,588

[22] Filed: Feb. 27, 1998

[51] Int. Cl.$^6$ .................................................. B05C 17/06
[52] U.S. Cl. .................................... 101/127.1; 101/128.1
[58] Field of Search ............................. 101/127.1, 128, 101/128.1, 127; 138/102.91, 102.6, 102.4, 102.1, 102; 160/375, 374, 372; 24/460, 462

[56] References Cited

U.S. PATENT DOCUMENTS 3,805,873  4/1974  Bloomfield ............................... 24/462

Primary Examiner—Edgar Burr
Assistant Examiner—Anthony H. Nguyen

[57] ABSTRACT

This invention is a clamping strip attached to a flexible sheet, such as screen printing fabric, that is shaped to enable it to lock into a channel. The strip comprises a first and a second leg joined to each other at an approximately right angle. The first leg is of a size so as to position into the recess on one side of the channel leaving enough room for at least one thickness of the flexible sheet. The second leg is of a size so as to position within the channel at the same time as the first leg is positioned. The flexible sheet is affixed to the strip and wraps around the first leg inside the recess and continues over a rounded edge above the recess. With the strip and attached flexible sheet positioned into the channel with the flexible sheet wrapped over the rounded edge, a pulling or tensioning of the flexible sheet will cause the strip and flexible sheet to become locked in the channel. As more tension is applied to the flexible sheet, the strip and flexible sheet become more firmly locked in the channel.

7 Claims, 9 Drawing Sheets

CLAMPING STRIPS AND LOCKING CHANNELS

BACKGROUND OF THE INVENTION

1. Field of the Invention

This invention relates in general to flexible sheet edging and anchoring means and in particular to clamping strips for anchoring screen fabric to locking channels on screen printing frames.

2. Background Information

U.S. Pat. No. 2,597,401 by Swanson, U.S. Pat. No. 3,225,407 by Daniels, U.S. Pat. No. 3,524,491 by Olson, U.S. Pat. No. 3,805,873 by Bloomfield, U.S. Pat. No. 3,982,306 by Curry, U.S. Pat. No. 4,631,786 by Curry, and U.S. Pat. No. 5,039,246 by Woodruff et al describe various channels and insertion strips for anchoring fabric panels, flexible sheets, webbing, covers, film, window screens and the like to walls, buildings, boat tops, swimming pools, porches, and various other objects. Although the object of these inventions is not specifically to anchor screen printing fabric to a frame, these inventions address the need to anchor a flexible sheet-like material to a structure. All use channels and insertable strips.

U.S. Pat. No. 3,489,085 by Kirkpatrick shows a channel and clamping strip for anchoring a rubber blanket around an offset printing cylinder.

In U.S. Pat. No. 3,482,343 by Hamu, U.S. Pat. No. 3,601,912 by Dubbs, U.S. Pat. No. 4,525,909 by Don Newman, and U.S. Pat. No. 4,539,734 by Messerschrmidt various channel and clamping strip anchoring means are described for screen-printing screens. In these inventions a screen fabric is anchored to a printing frame.

There are many examples in this art of edging strips that are not attached or bonded to screen fabric such as Messerschmidt, Daniels, Curry, and Woodruff. A precisely predetermined pattern of attached screen clamping strips imparts many beneficial qualities to a screen when it is stretched on a frame. Of the above art, only Kirkpatrick and Bloomfield teach sheet-like materials with attached clamping strips.

The clamping strips of printing screens, ideally, should be somewhat shorter than the lengths of each screen edge so as not to attach to the fabric in the corners. The channels of Kirkpatrick and Bloomfield permit the insertion of the strips into the channel from above along the length of the channel as well as from the ends of the channel. It is necessary to enter the channel from above when anchoring a rectangular screen to a four sided frame. U.S.. Pat. No. 5,443,003 by Larson, and U.S. Pat. No. 5,522,314 by Eugene Newman teach permanently attached clamping strips to screens for insertion into a channel from above. These clamping strips, however, differ from the Kirkpatrick and Bloomfield inventions because they merely hook over one of the overturned lips defining a wall portion of the channel and are not really lodged within the channel. Bloomfield, as will be explained in a later paragraph, describes a locking mechanism that becomes stronger as more stress is applied. This characteristic differentiates Bloomfield from Kirkpatrick as well as from Newman and Larson whose attachments are more likely to weaken as more stress is applied. If the teaching of Bloomfield were to be combined with Newman and Larson, what results is an advancement in the art of locking attached clamping strips along a screen edging into channels on all four sides of a screen frame. However, as will be explained in a later paragraph, this combination, if advanced, has a deficiency. The present invention overcomes this deficiency.

In Kirkpatrick and Bloomfield one edge of a substantially flat clamping strip enters into a relatively deep undercut that forms a part of one side of the channel, with the clamping strip so inserted into this undercut, the clamping strip is then redirected so as to insert the opposite edge of the clamping strip into a relatively shallow undercut that forms a part of the opposite side of the channel. This edge of the clamping strip is inserted all the way into this shallow undercut until it abuts against the inside wall. With a clamping strip that is wider than the combined width of the shallow undercut plus the width of the opening between the undercuts but narrower than the overall width of the channel which would include both undercuts and the opening between the undercuts, the clamping strip will extend all the way into the shallow undercut, across the opening between the undercuts, and partially into the deeper undercut. With the flexible sheet tucked under and around the clamping strip so that it is between the clamping strip and the walls of the undercut, the stronger the pull of the flexible sheet the more firmly the clamping strip presses the flexible sheet against the wall within the channel. The locking action increases in direct relation to the increase in stress. The Bloomfield channel and clamping strip anchoring device, however, will not work with a symmetrical channel having two equally deep undercuts. The only way to lodge the Bloomfield clamping strip in such a channel is through the ends of the channel. In a four sided frame, it is impossible to insert perpendicular edging strips attached to a flexible sheet through the ends of the channels on the sides of the frame in both the X and Y axis. Most roller frames used in the screen industry have symmetrical undercuts in the channels. Therefore, the Bloomfield invention is useless with these frames.

Dubbs and Hamu show unattached clamping strips and a single undercut channel in which the strip abutment is against a flat wall rather than a shallow undercut. The clamping strip of Dubbs and Hamu will not lock into a symmetrically shaped channel.

Given all of the above recited art, there are no combinations of technology in which clamping strips attached to the edges of screen fabric can be locked onto a printing frame with symmetrically shaped locking channels. U.S. Pat. No. 4,525,909 by Don Newman describes a symmetrical channel on a roller frame for screen printing. This invention describes unattached clamping strips that must be inserted from the roller ends. This type of roller frame with its symmetrical locking channels has become very popular and widely used in the screen printing industry. With their large numbers, a significant problem is how to use these frames with clamping strips attached to the edges of screen fabric. An object of this invention is to solve this problem. Another object of this invention is to provide an attached screen fabric clamping strip capable of locking screen fabric into a greater variety of frame locking channels.

SUMMARY OF THE INVENTION

This invention is a clamping strip attached to a flexible sheet, such as screen printing fabric, that is shaped to enable it to lock into an embedded channel having an undercut or recess along the length of one or both sides of the channel. The recesses may be of equal or unequal depth. The strip comprises a first and a second leg joined to each other at an approximately right angle. The first leg is of a size so as to position into the recess on one side of the channel leaving enough room for at least one thickness of the flexible sheet.

The second leg is of a size so as to position within the channel as the first leg is inserted into the recess leaving enough room for a least one thickness of the flexible sheet within the channel. The flexible sheet is affixed to the clamping strip and wraps around the tip of the first leg inside the recess and continues over a rounded edge that is above the recess. With the clamping strip and attached flexible sheet positioned into the channel with the flexible sheet wrapped over the rounded edge, a pulling or stretching of the flexible sheet will cause the flexible sheet material to shorten within the channel. This shortening pulls the tip of the first leg upward and against the channel wall in the recess below the rounded edge. As the flexible sheet is further tightened and shortened within the channel, the tip of the first leg moves along the channel wall towards the opening of the channel and the second leg is forced backwardly toward the opposite wall of the channel until it abuts against this wall. The abutment of the first and second legs caused by the tensioning of the flexible material causes the clamping strip and flexible sheet to become locked in the channel. As more tension is applied to the flexible sheet, the clamping strip and flexible sheet become more firmly locked in the channel.

DETAILED DESCRIPTION

Figure 1:
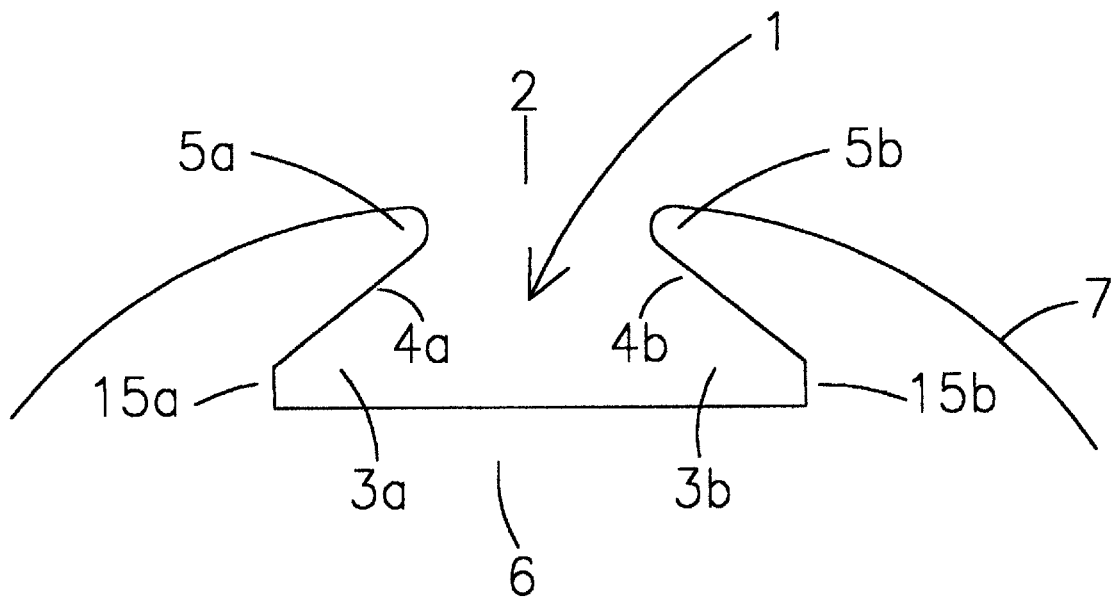
FIG. 1 is a cross-sectional drawing of a symmetrical channel within a roller of a screen printing roller frame.
Figure 11:
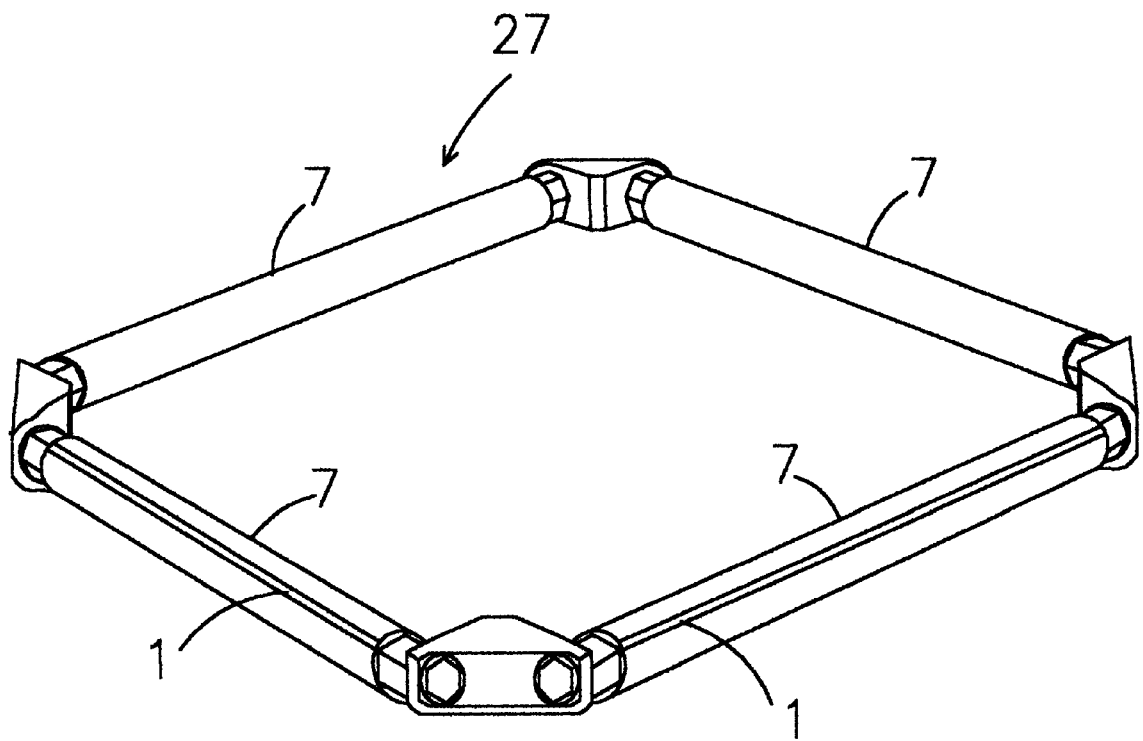
FIG. 11 is a perspective drawing showing a roller frame having four roller sides.

Referring to FIG. 1, a cross-sectional drawing of a clamping channel 1 is shown. Channel 1 is embedded in the surface of a roller 7 comprising one side of a roller frame 27 for screen printing (see FIG. 11). Channel 1 is an elongated symmetrical channel having an open top 2, a side wall facing towards the inside of the frame which may have angled portions 4b and 15b, an opposite side wall with angled portions 4a and 15a, and a base 6 forming a channel bottom between the side walls. Channel 1 comprises recesses 3a and 3b in the side wall portions 4a, 15a, 4b, and 15b forming rounded edges 5a and 5b with the surface of roller 7.

Figure 2:
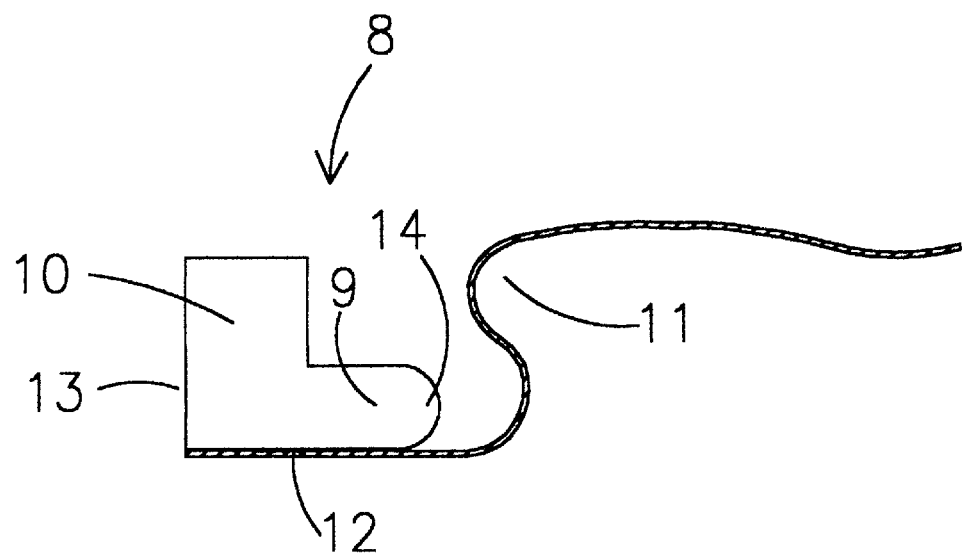
FIG. 2 is a cross-sectional drawing of the preferred embodiment of the clamping strip of the present invention.

Referring to FIG. 2, a cross-sectional view of the clamping strip 8 is shown. Clamping strip 8 is made of a rigid or semi-rigid material such as metal, plastic, wood, or the like. Clamping strip 8 comprises a first leg 9 and a second leg 10 which are joined at a perpendicular angle to each other and extend along the length of the strips. These legs may be at an angle somewhat less than or greater than perpendicular if such angle does not impede the performance of the clamping strip. The sizes of legs 9 and 10 are calculated to allow clamping strip 8 to position and lodge into channel 1. The width of leg 10 must be less than the width of channel opening 2 and the height of leg 10, in the preferred embodiment, is approximately the same as the depth of channel 1. Depending on the angle of the wall 5a, which defines a portion of one side of the channel 1, and the dimensions of clamping strip 8 in relation to channel 1, the height of leg 10 may be less than the depth of channel 1. The height of leg 10 may be greater than the depth of the channel 1. The size of leg 9 must be such that it can fit within the recess 3b of channel 1 as clamping strip 8 is positioned into channel 1. Like a foot inserting into a shoe, it is preferable that clamping strip 8 fits not too tightly or too loosely into channel 1 and that there is amble room for a flexible sheet 11 to fit between clamping strip 8 and channel 1. Leg 9, preferably, is rounded at the tip 14. With the tip 14 of leg 9 facing inwardly on the flexible sheet 11, clamping strip 8 is attached to flexible sheet 11 parallel to and along the edges of the flexible sheet 11. Clamping strip 8 is affixed to the flexible sheet 11 along side 12 of leg 9 or to side 13 of leg 10 with flexible sheet 11 projecting beyond the tip 14 of leg 9.

Figure 3:
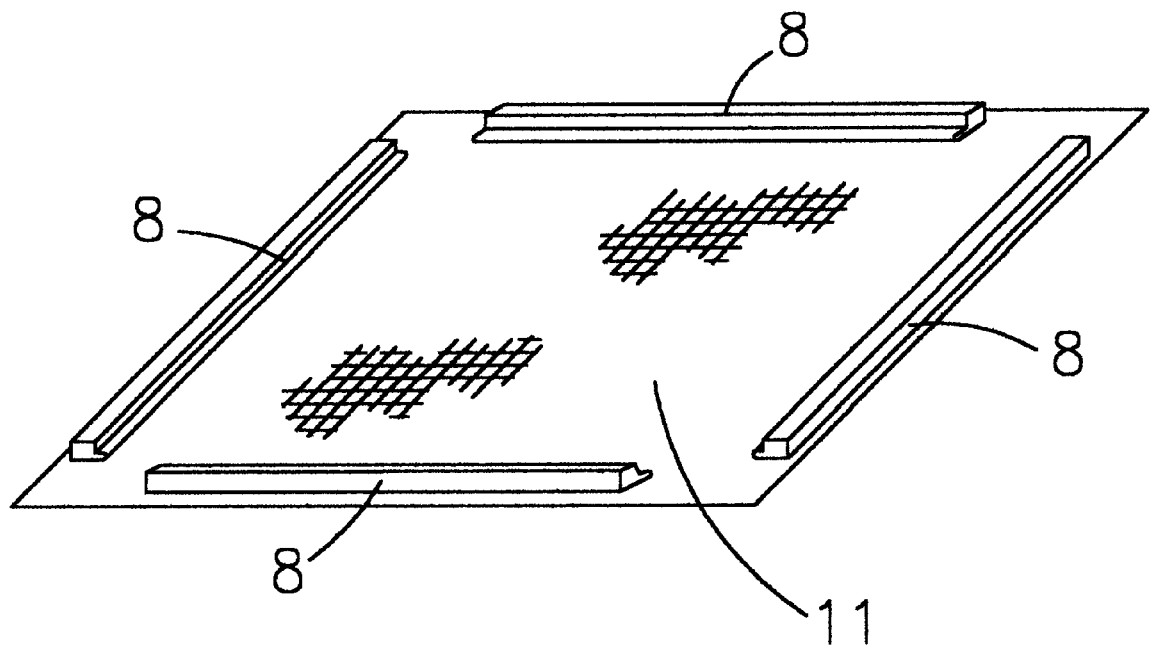
FIG. 3 is a perspective drawing showing the printing side of a rectangular screen for screen printing with attached clamping strips on all four screen edges.
Figure 12:
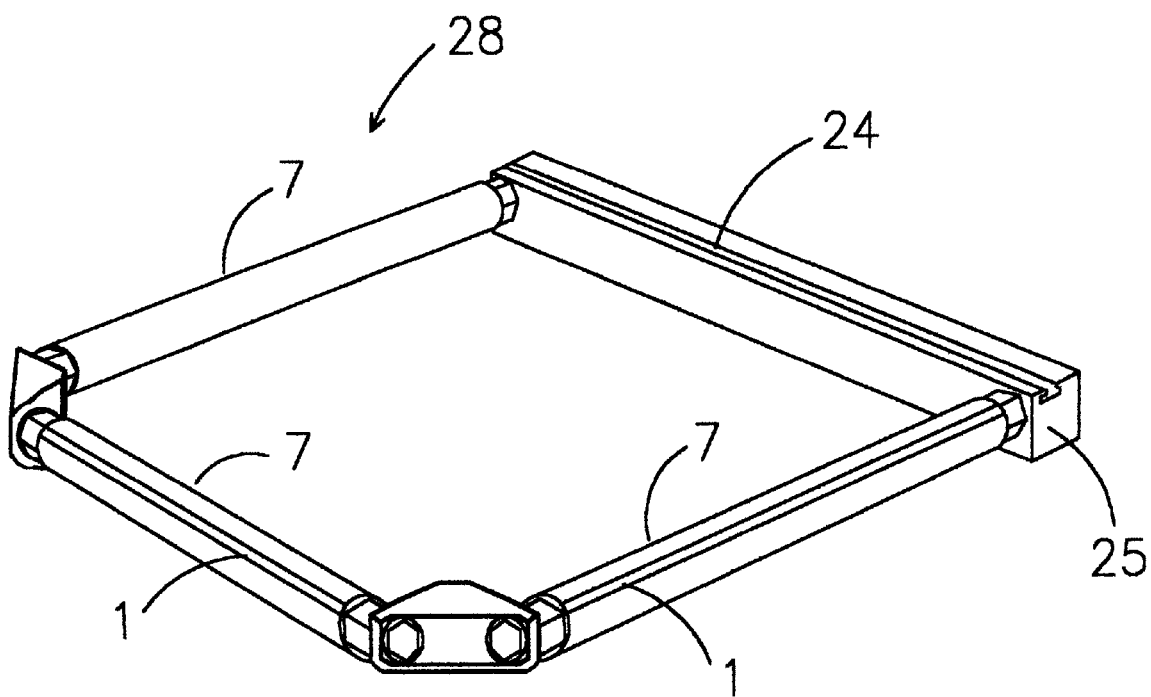
FIG. 12 is a perspective drawing showing a roller frame having three roller sides and a bar side.

In screen printing, the flexible sheet 11 is a substantially rectangular screen fabric attached onto the sides of a tensioning frame. FIG. 3 shows a preferred embodiment of this type of flexible sheet 11 with the clamping strips 8 attached along all four edges of the flexible sheet 11. The clamping strips 8 are shorter than the length of the edges of the flexible sheet 11 so as not to be connected to each other and to leave the corner areas of the flexible sheet 11 unattached. This allows the clamping strips 8 to be positioned into channels 1 on each side of a tensioning frame without running into encumbrances in the corners. The flexible sheet 11 must be large enough to fit over a tensioning frame without being too large to stretch within the dimensions of the tensioning frame. The clamping strips and locking channels of the present invention may be used with a variety of tensioning frames. One such tensioning frame is a rectangular roller frame 27 having four sides comprising four rollers 7 with a channel 1 embedded in the surface of each roller. Another tensioning frame 28 (see FIG. 12) is a rectangular roller frame having one bar side 25 and three roller sides 7 with a channel embedded in the surface of each side. Also, there are many types of tensioning frames that comprise various rectangular arrangements of four bar sides that expand outwardly to stretch attached fabric. The present invention can be used with all of these frames.

Figure 4:
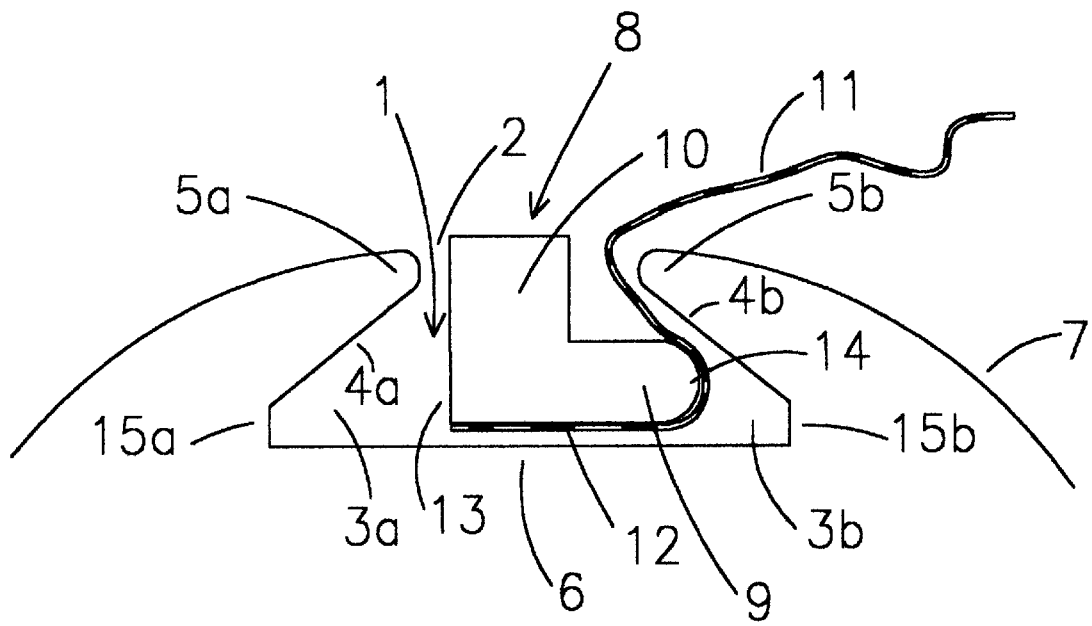
FIG. 4 is a cross-sectional drawing of a symmetrical channel within a roller of a screen printing roller frame with a clamping strip and attached flexible sheet inserted and with the attached flexible sheet not tensioned.
Figure 5:
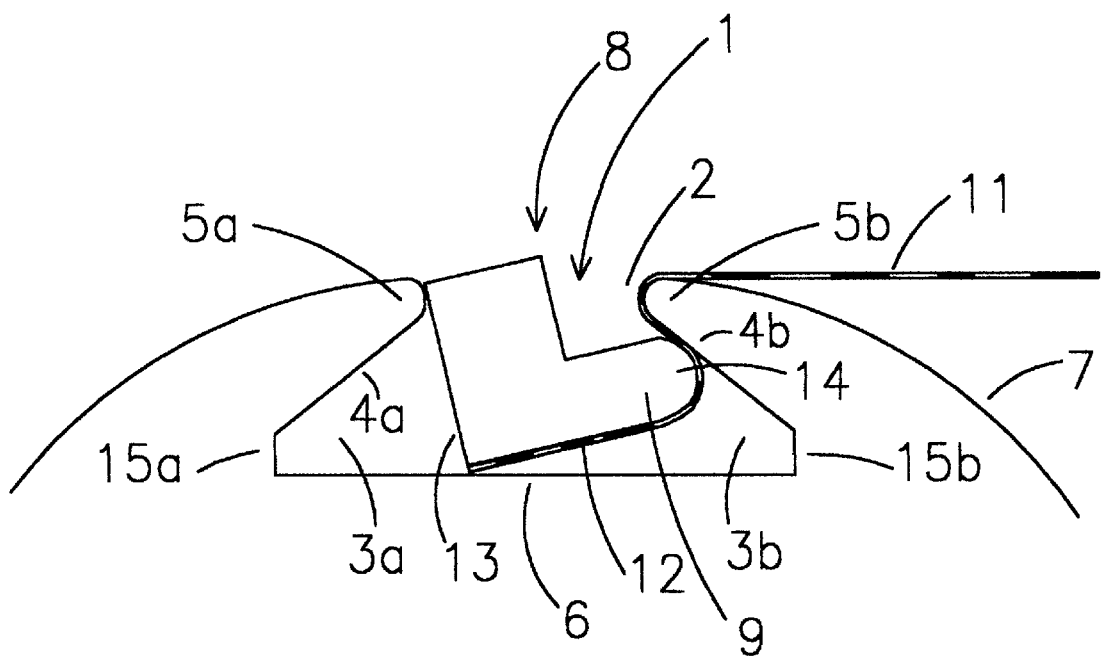
FIG. 5 is a cross-sectional drawing of a symmetrical channel within a roller of a screen printing roller frame with a clamping strip and attached flexible sheet inserted and with the attached flexible sheet tensioned.

When clamping strip 8 and affixed flexible sheet 11 are positioned into channel 1, as shown in FIG. 4, the flexible sheet 11 wraps around tip 14 of leg 9 and is sandwiched between leg 9 and wall 4b. The flexible sheet 11 also wraps over the rounded edge 5b of the surface of frame side 7 as the other clamping strips 8 on the other edges of the flexible sheet 11 are positioned into channels 1 on the other roller sides 7 of the tensioning frame. This mounting of the flexible sheet 11 to a tensioning frame orients the flexible sheet 11 over the rounded edge 5b of the surface of the frame roller sides 7. As the flexible sheet 11 is stretched, or tensioned, the flexible sheet 11 wrapped around leg 9 and rounded edge 5b shortens. As it shortens, it lifts leg 9 up and abuts it against channel wall 4b and pulls leg 9 backward towards channel opening 2. This causes leg 10 to tilt and also move backward toward wall 4a until it abuts against this wall. This abutment prevents any further movement of clamping strip 8 within channel 1. Clamping strip 8 is now lodged within channel 1, as shown in FIG. 5. The more the flexible sheet 11 is tensioned, the more tightly it is compressed between leg 9 and channel wall 4b. The locking force of the clamping strip 8 increases in direct proportion to the tightness of the flexible sheet 11.

The channel 1 of FIG. 1, FIG. 4, and FIG. 5 is symmetrical. The recesses 3a and 3b are of equal depth. Clamping strip 8 is able to lodge within channel 1 because side 13 of leg 10 abuts against the relatively shallow portions of channel wall 4a rather than against the deeper portions of channel wall 4a and 15a. It is this early abutment of side 13 that quickly stops the backward movement of clamping strip 8 and maintains the engagement of leg 9 against channel wall 4b.

Figure 6:
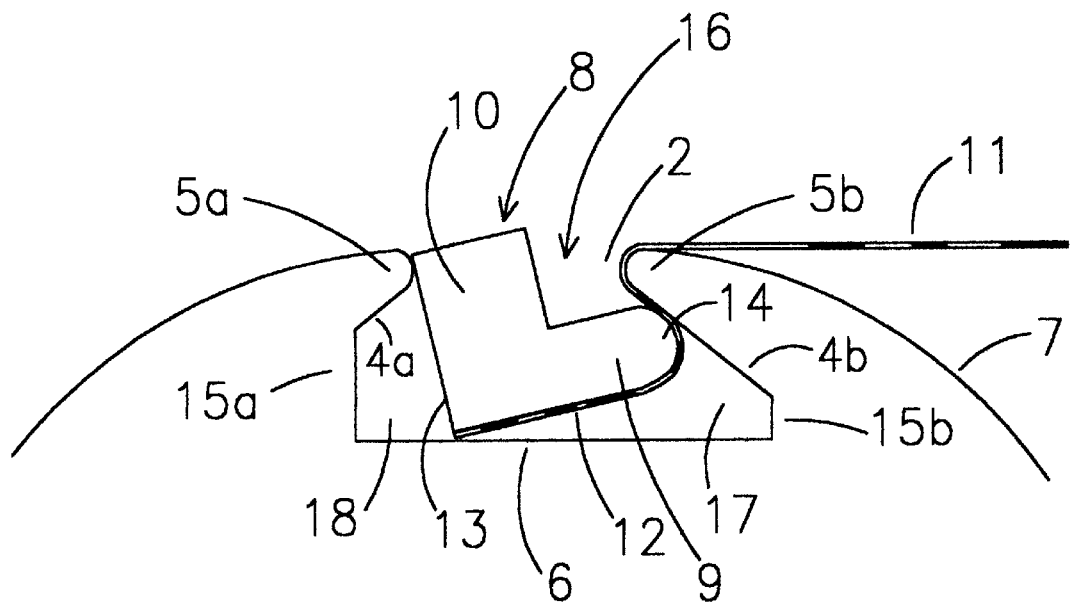
FIG. 6 is a cross-sectional drawing of a channel having one relatively deep undercut on one side of the channel and one relatively shallow undercut on the other side of the channel within a roller of a screen printing roller frame with a clamping strip and attached flexible sheet inserted and with the attached flexible sheet tensioned.

FIG. 6 shows clamping strip 8 in a channel 16 comprising a deep recess 17 and a shallow recess 18. By positioning clamping strip 8 into channel 16 so that leg 9 fits into recess 17, clamping strip 8 will become lodged in channel 16 when flexible sheet 11 is tensioned. The locking action is identical to the locking action within a symmetrical channel 1.

Figure 7:
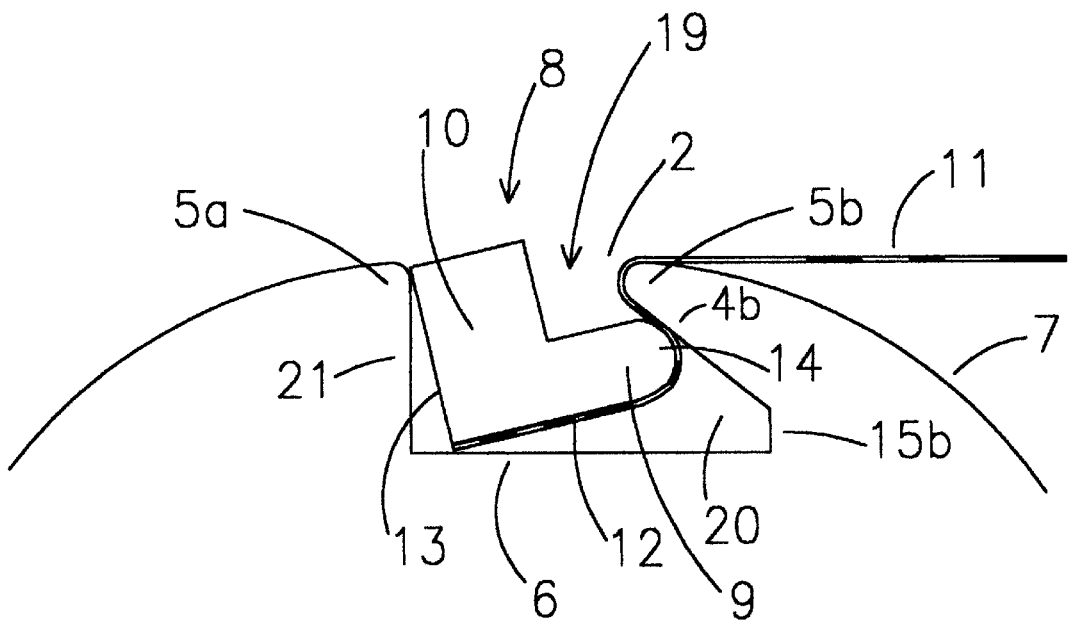
FIG. 7 is a cross-sectional drawing of a channel having one undercut on one channel side and a flat wall one the other channel side within a roller of a screen printing roller frame with a clamping strip and attached flexible sheet inserted and with the attached flexible sheet tensioned.

FIG. 7 shows clamping strip 8 in a channel 19 with only one recess 20. Channel 19 comprises a side wall 21 that is at an angle sufficient to abut side 13 of clamping strip 8. By positioning clamping strip 8 into channel 19 so that leg 9 fits into recess 20, clamping strip 8 will become lodged in channel 19 when flexible sheet 11 is tensioned. The locking action is identical to the locking action within a symmetrical channel 1 and a non-symmetrical channel 16.

Figure 8:
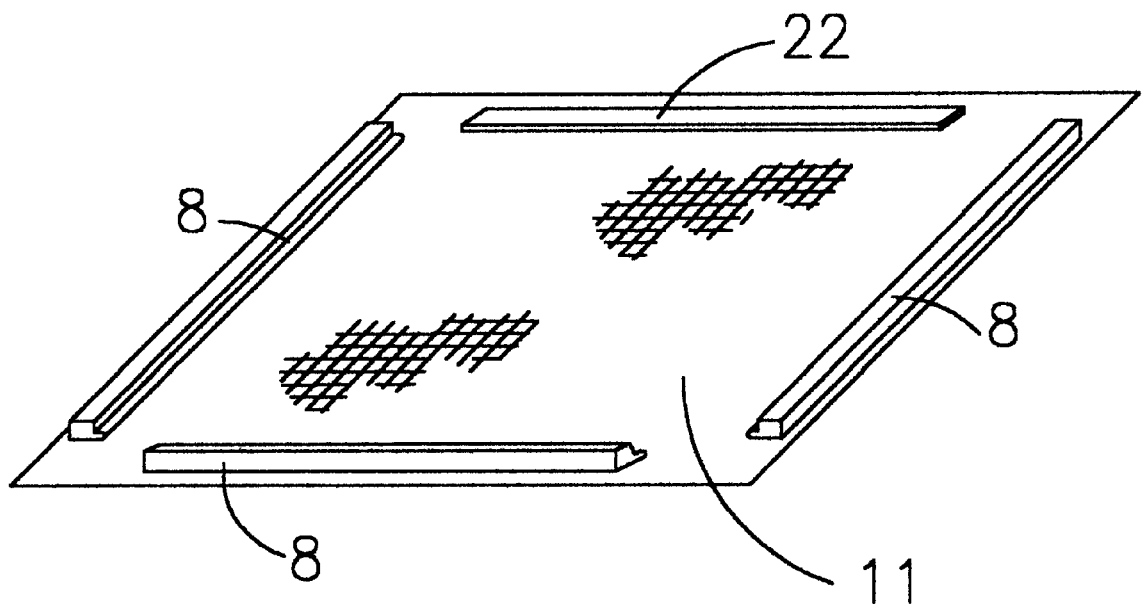
FIG. 8 is a perspective drawing showing the printing side of a rectangular screen for screen printing with attached clamping strips on all four screen edges wherein one of the clamping strips is flat.
Figure 10:
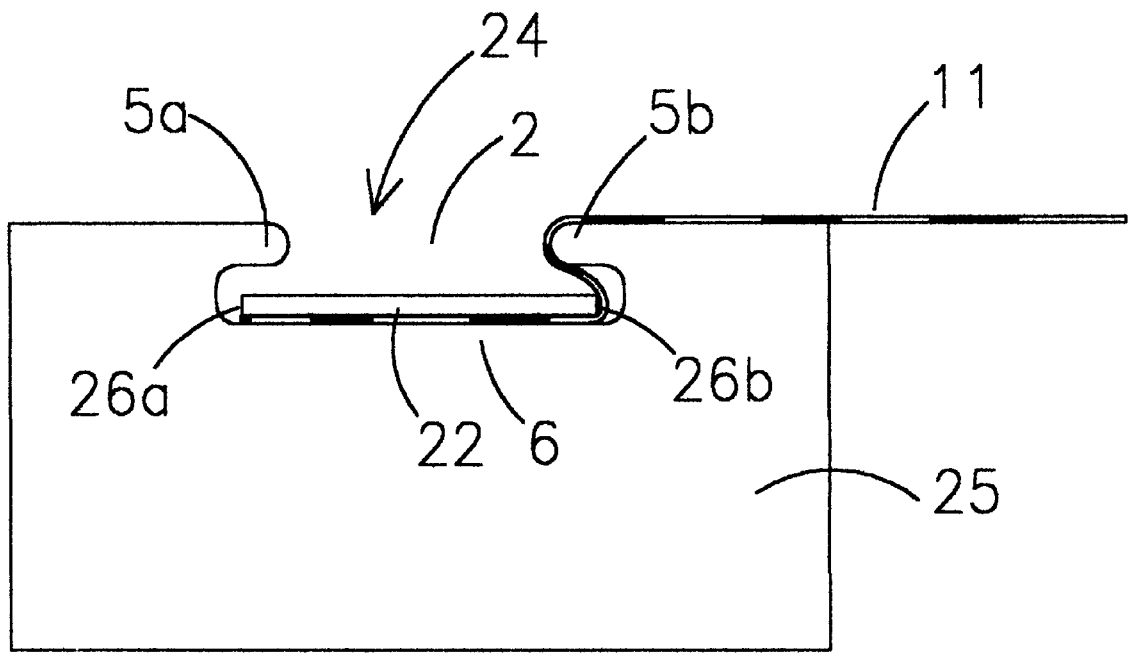
FIG. 10 is a cross-sectional drawing of a bar side of a screen printing frame.

The clamping strips 8 and locking channels 1, 16, and 19 of the present invention may be used in combination with a flat clamping strip 22 affixed to a flexible sheet 11 as shown in FIG. 8. In FIG. 10 the flexible sheet 11 is shown affixed to the bottom of the clamping strip 22 so as to enter the channel 24 sandwiched between the bottom of the flat clamping strip 22 and the base 6 of the channel 24, folding around an edge 26b of the flat clamping strip 22, and folding over the rounded edge 5b to the surface of bar 25. An end of said flat clamping strip 22 and the affixed flexible sheet 11 are first fitted into an end of the channel 24 and slid along the length of the channel 24 until centered. Then the remaining three clamping strips 8 are positioned through the top openings 2 in channels 1 on the remaining three sides of the frame.

The channels 1, 16, and 19 and the clamping strip 8 of this invention have been illustrated as part of a tensioning frame, but they can also be used to anchor a flexible sheet 11 to any object with the flexible sheet 11 wrapped around a rounded edge 5b on the surface of the object and tensioned.

Figure 9:
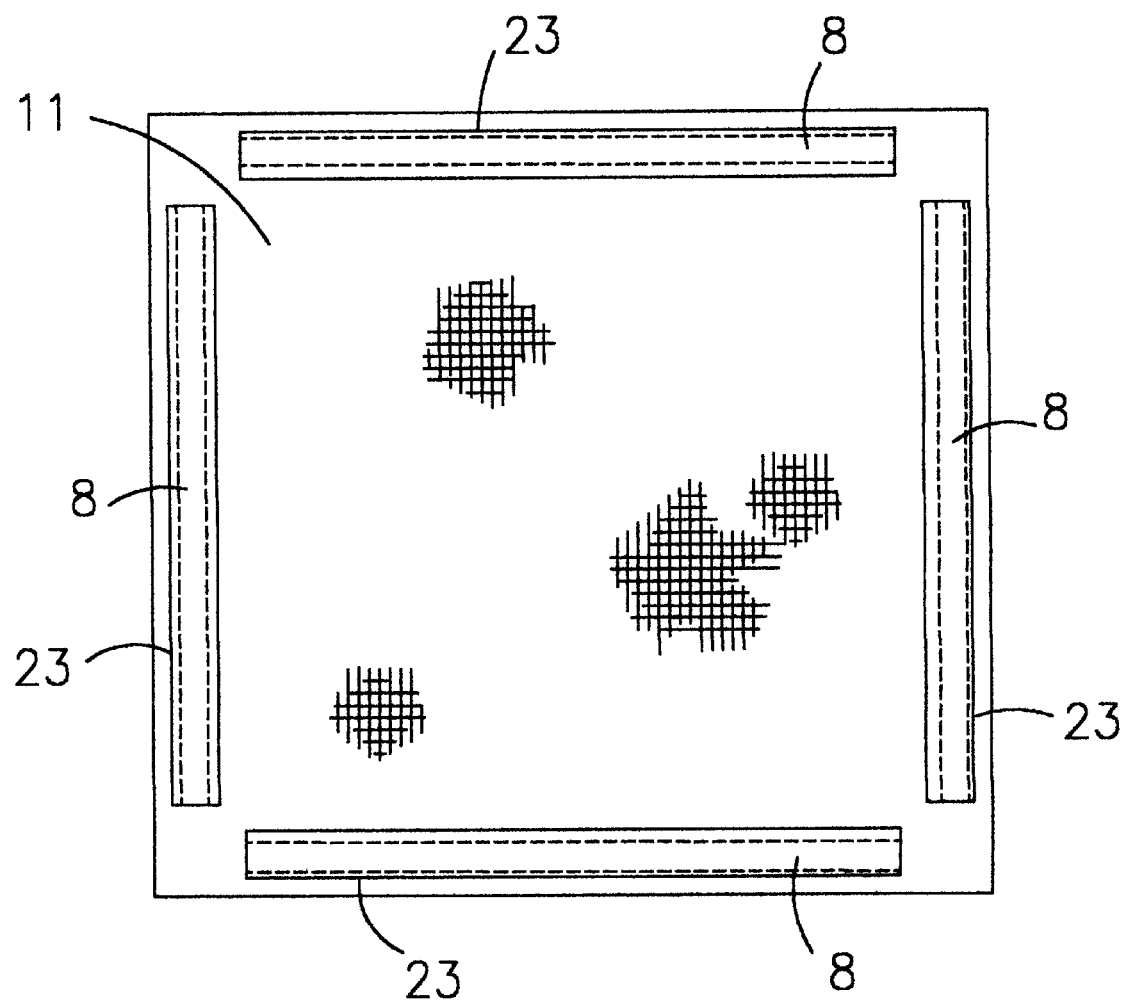
FIG. 9 is a top view of the non-printing side a rectangular screen for screen printing showing attached tape on the screen surface opposite the clamping strips.

The flexible sheet 11 of the present invention optionally may comprise an adhesively attached thin flexible material such as tape 23 of FIG. 9. The tape 23 is attached to the flexible sheet 11 preferably on the surface areas opposite the surface upon which are affixed clamping strips 8. These tapes become positioned inside and near channels 1 of FIG. 1, channels 16 of FIG. 6, and channels 19 of FIG. 7 when the clamping strips 8 are positioned in these respective channels. The tape 23 is thin and flexible and is intended as a protective layer to prevent tearing of the flexible sheet 11 in and around said channels 1, 16, and 19. Said tape 23 may also be used in screens comprising unaffixed clamping strips, such as are commonly used in the art, with the tape 23 attached to either surface side of screen fabric 11 generally in the areas of the screen fabric 11 positioned in locking channels 1, 16, and 19 of the frame.

The above detailed description of the preferred embodiment of the invention has been presented for the purpose of illustration and description. It is not intended to be exhaustive or to limit the invention to the precise forms described. Many modifications and variations are possible in the light of the above teaching. It is intended that the scope of the invention not be limited by this detailed description, but rather by the claims appended hereto.

What is claimed is:

1. A printing screen and frame assembly comprising
   (1) a rectangular roller frame having four sides comprising four rollers with a channel embedded into the surface of each of said sides,
   (2) a flexible substantially rectangular fabric screen, said screen having four edges and four clamping strips affixed parallel to and along each edge of said screen without being connected to each other, and wherein
      each of said channels comprises an open top, a channel wall facing towards the inside of said frame, an opposite wall, and a base between said walls and
      each of said channels comprises a recess in said channel wall facing towards the inside of said frame forming a rounded edge with the surface of said rollers and
      each clamping strip comprises a first and a second leg joined at an angle extending along the length of said clamping strips wherein
      said first legs and affixed screen fit into said recesses of said channels and said second legs fit within said channels.

2. The printing screen of claim 1 in which said screen comprises an additional layer of flexible material adhesively attached on the surface of said screen opposite said clamping strips, said flexible material covering areas of said screen which are positioned within said channels when said flexible sheet is mounted on said frame.

3. A printing screen and frame assembly comprising
   (1) a rectangular roller frame having four sides comprising a bar side and three roller sides with a channel embedded into the surface of each of said sides,
   (2) a flexible substantially rectangular fabric screen, said screen having four edges and four clamping strips affixed parallel to and along each edge of said screen without being connected to each other, and wherein
      each of said channels comprises and open top, a channel wall facing towards the inside of said frame, an opposite wall, and a base between said walls and
      each of said channels comprises a recess in said channel wall facing towards the inside of said frame forming a rounded edge with the surface of said rollers and
      one of said clamping strips is positioned and sized with the affixed screen to fit into the channel of said bar by fitting one end of said clamping strip and affixed screen into one end of said bar channel and sliding said clamping strip and affixed screen into said bar channel until said clamping strip is centered within said bar channel with said attached screen folded over the surface of said bar facing towards the inside of said frame and the remaining three of said clamping strips comprise a first and a second leg joined at an angle extending along the length of said clamping strips wherein said first legs of said remaining clamping strips and affixed screen fit into said recesses of said channels and said second legs of said remaining clamping strips fit within said channels of said rollers.

4. The printing screen of claim 3 in which said screen comprises an additional layer of flexible material adhesively attached on the surface of said screen opposite said clamping strips, said flexible material covering areas of said screen which are positioned within said channels when said flexible sheet is mounted on said frame.

5. The printing screen and frame assembly of claim 3 wherein one of said clamping strips is substantially flat, the ends of which with said affixed screen can be fitted into the ends of a shallow channel of a bar and said clamping strip and affixed screen can be slid into and centered along the length of said channel.

6. A printing screen and frame assembly comprising (1) a rectangular expandable frame having four sides comprising four bars with a channel embedded into a surface of each of said sides, said surface of each of said sides substantially within the same plane, (2) a flexible substantially rectangular fabric screen, said screen having four edges and four clamping strips affixed parallel to and along each edge of said screen without being connected to each other, and wherein each of said channels comprises an open top, a channel wall facing towards the inside of said frame, an opposite wall, and a base between said walls and each of said channels comprises a recess in said channel wall facing towards the inside of said frame forming a rounded edge with said surface of said frame side and each clamping strip comprises a first and a second leg joined at an angle extending along the length of said clamping strips wherein said first legs and affixed screens fit into said recesses of said channels and said second legs fit within said channels.

7. The printing screen of claim 6 in which said screen comprises an additional layer of flexible material adhesively attached on the surface of said screen opposite said clamping strips, said flexible material covering areas of said screen which are positioned within said channels when said flexible sheet is mounted on said frame.

* * * * *